United States Patent [19]

Jackman et al.

[11] 4,281,844

[45] Aug. 4, 1981

[54] STEERABLE CASTORED VEHICLE

[75] Inventors: Thomas R. Jackman, London; Trevor J. Stonebanks, Dartford, both of England

[73] Assignee: Shendale Ltd.

[21] Appl. No.: 958,995

[22] Filed: Nov. 9, 1978

[51] Int. Cl.³ .................................................. B62D 1/18
[52] U.S. Cl. ................................ 280/87.01; 280/47.11; 280/47.34; 280/79.1 R; 280/771; 280/263; 280/282
[58] Field of Search .................. 280/87.01, 282, 47.11, 280/47.1, 87.02 R, 87.04 R, 87.04 B, 47.34, 771, 87.1, 16, 21 A, 263, 12 H, 12.1, 84.04 A, 79.1, 11.19

[56] References Cited

U.S. PATENT DOCUMENTS

| 324,364 | 8/1885 | Cornelius ........................... 280/11.19 |
| 1,056,357 | 3/1913 | Murdock ........................ 280/87.04 R |
| 1,410,373 | 3/1922 | Choate et al. .................. 280/87.04 R |
| 1,418,569 | 6/1922 | Herrick ..................... 280/87.04 R X |
| 1,745,258 | 1/1930 | Halloween .......................... 280/79.1 |
| 1,894,160 | 1/1933 | Clark ............................. 280/87.01 X |
| 2,878,032 | 3/1959 | Hawke ................................ 280/282 |
| 3,504,934 | 4/1970 | Wallis .................................. 280/282 |
| 3,561,778 | 2/1971 | Brie ................................ 280/282 X |
| 3,605,929 | 9/1971 | Rolland ........................... 280/282 X |
| 4,071,261 | 1/1978 | Winchell ......................... 280/282 X |

FOREIGN PATENT DOCUMENTS

| 167057 | 5/1904 | Fed. Rep. of Germany .... 280/87.02 R |
| 499656 | 11/1954 | Italy ....................................... 280/21 A |
| 182554 | 2/1963 | Sweden ............................... 280/47.34 |

Primary Examiner—Joseph F. Peters, Jr.
Assistant Examiner—D. W. Underwood
Attorney, Agent, or Firm—Cushman, Darby & Cushman

[57] ABSTRACT

A vehicle comprises a support surface which is mounted upon at least two carriers, one of the carriers being steerable and having a castor like structure and in which steering can take place by tilting of the castoring axis of the castor like structure.

19 Claims, 7 Drawing Figures

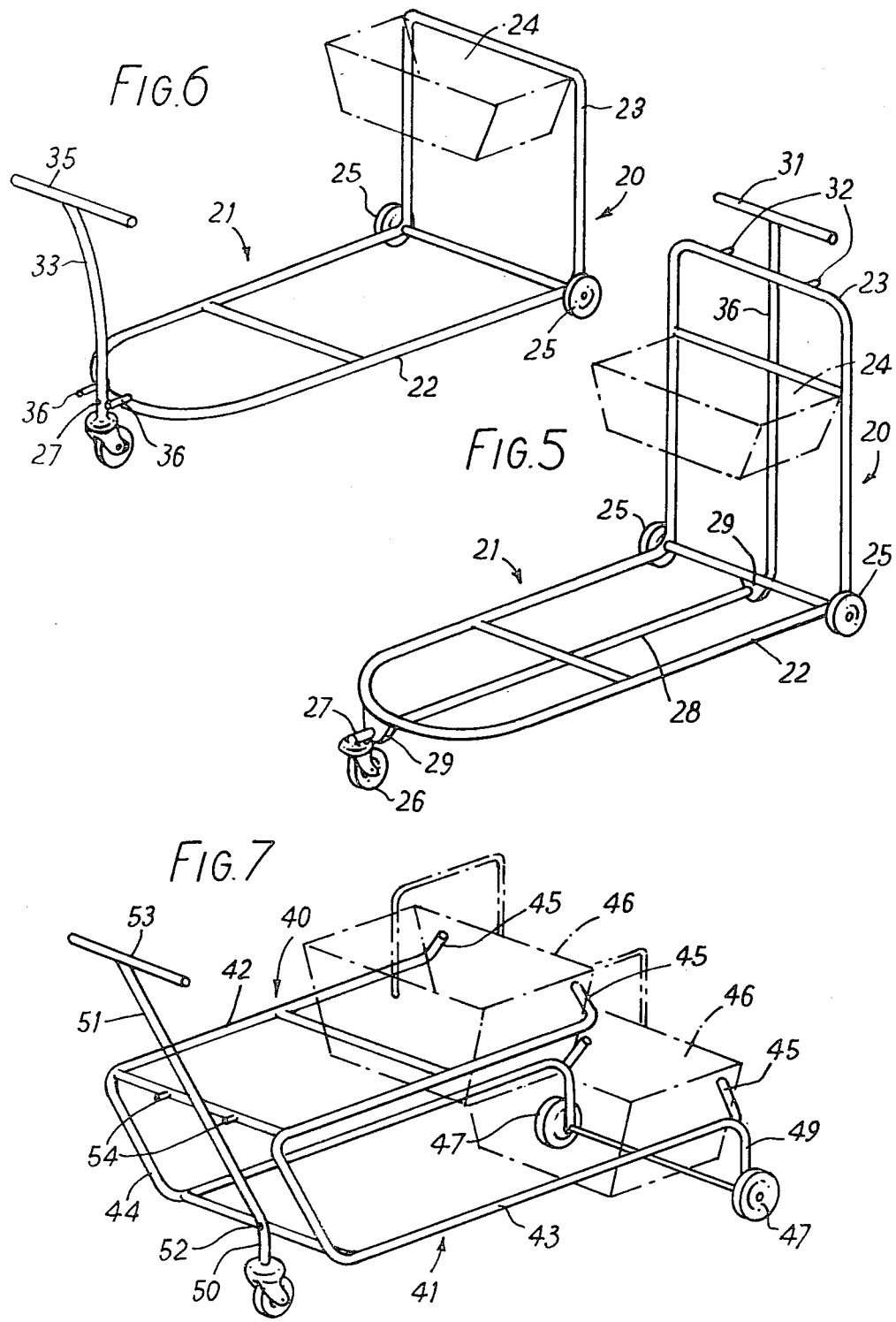

STEERABLE CASTORED VEHICLE

BACKGROUND OF THE INVENTION

This invention relates to a vehicle and in particular to a steerable vehicle.

SUMMARY OF THE INVENTION

It is an object of the invention to seek to provide a steerable vehicle having a novel form of steering arrangement.

According to the first aspect of the invention, a vehicle comprises a support surface mounted upon at least two carriers wherein at least one of the carriers is steerable and has a castor like structure in which steering takes place by tilting of the castoring axis of the castor like structure.

According to a second aspect of the invention, a vehicle comprises a framework supported by two wheels at the rear and a steerable castored wheel at the front, a seat member mounted towards the rear of the framework, a foot support cross bar mounted towards the front of the framework and steering means operable by a person seated in the seat for tilting the castoring axis of the steerable castored wheel.

According to a third aspect of the invention a vehicle comprises an "L" shaped framework having a base part for carrying luggage or other articles and an upright rear part, wherein two fixed wheels support the rear of the base part where it is connected to the upright part, a castored wheel supports the front of the base part and means are provided for tilting the castoring axis of the castored wheel to enable the vehicle to be steered.

According to a fourth aspect of the invention, a vehicle comprises a substantially "U" shaped frame comprising two horizontally extending parts spaced apart vertically and joined by a part extending between them, wherein one end of the lower of the two horizontally extending parts is carried by a pair of fixed wheels, the other end of said lower horizontally extending part is carried by a castored wheel and steering means are provided for tilting the castoring axis of the castored wheel to enable the vehicle to be steered.

BRIEF DESCRIPTION OF THE DRAWINGS

The invention will now be described in greater detail, by way of example, with reference to the drawings, in which:

FIG. 5 is a perspective view of a first form of luggage trolley forming a second embodiment of a vehicle in accordance with the invention;

FIG. 6 is a perspective view of a variation of the luggage trolley shown in FIG. 5; and FIG. 7 is a perspective view of a shopping trolley forming a fourth embodiment of a vehicle in accordance with the invention.

DESCRIPTION OF THE PREFERRED EMBODIMENTS

Figure 1:
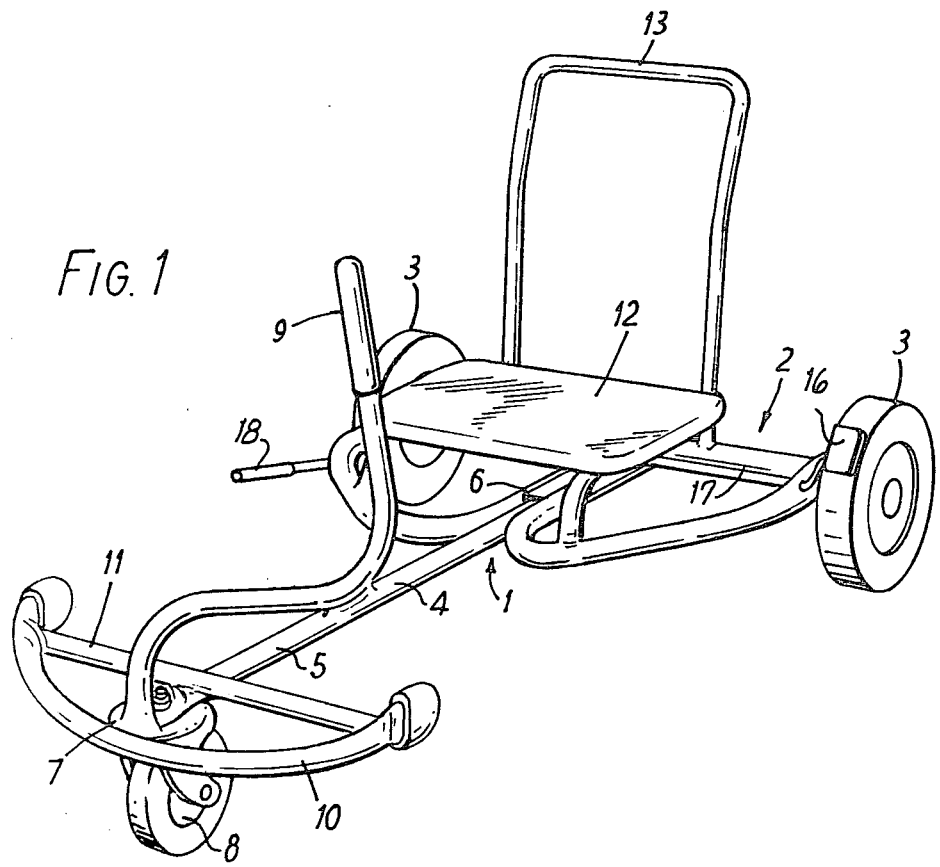
FIG. 1 is a perspective view of a go-cart like trolley for use by children forming one embodiment of a vehicle in accordance with with the invention.
Figure 2:
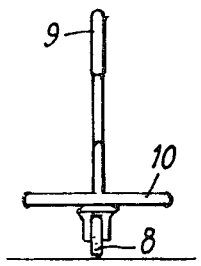
FIGS. 2 to 4 are front views of the front part of the trolley indicating the operation of the steering arrangement.

Referring firstly to FIGS. 1 to 4, the trolley depicted is of a go-cart like form and comprises a framework 1 which is of generally "T" shape construction made up of tubular elements and consisting of a head portion 2 at each end of which there are a pair of fixed wheels 3. The stem 4 of the T is in two relatively moveable parts 5 and 6 of which the part 5 can pivot about its own axis within the part 6. The pivoted movement is limited by stops. At the front end 7 of this part 5 is carried a castored wheel 8 which is used for steering as will be described. The pivotable part 5 carries an upwardly extending joystick like operating lever 9 together with a cross frame 10 including a cross bar 11 which enables a child sitting on a seat 12 mounted on the frame 1 to support his feet above the ground and also to assist in the steering operation. A bent rod 13 forms a back to the seat.

In the operation of the trolley, in order to make the trolley to proceed straight ahead, the axis of the castored wheel 8 is maintained in an upright condition (FIG. 2) and thus no biasing or tilting is applied to the castoring axis of the castored wheel 8.

Figure 3:
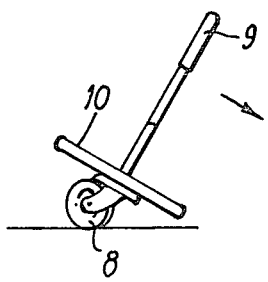
Figure 4:
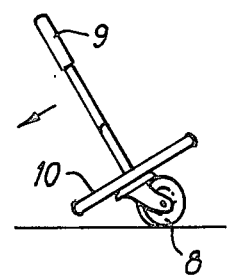

In order to make the trolley turn to the left, the wheel carrying part 5 is pivoted to the left, thus tilting the axis of the castored wheel from the vertical and causing the castor wheel to turn about the castor axis towards the position shown in FIG. 3 whereby the trolley will turn to the left.

In order to make the trolley move to the right, the wheel carrying part 5 is pivoted in the opposite direction i.e. to the right (FIG. 4) thus making the castor axis incline in the opposite direction and cause the castored wheel 8 to turn about the castoring axis so as to steer the trolley to the right.

Where the trolley is to be used by children of different ages, the pivotal member 5 and its socket 6 may be telescopically arranged so that the distance between the cross bar foot rest 10 and the seat 12 can be varied to suit the child concerned.

The rear wheels 3 are shown provided with a hand operated brake. This comprises shoes 16 (only one of which is visible) acting on the wheels 3. The shoes 16 are connected by a linkage 17 operable by means of a handle 18.

FIGS. 5 and 6 show two versions of the applications of the steering principal in accordance with the invention to a suitcase or luggage transporter of the type often provided for the use of travellers at airports, stations and the like. Generally speaking the transporter 20 comprises an "L" shape framework 21 having a horizontally extending base portion 22 for receiving cases and other luggage and an upright rear portion 23 which may suitably carry a fixed or detachable basket 24 for handbags and small luggage. In both figures, the base portion 22 is supported at its rear on two fixed wheels 25 and at its front on a single castored wheel 26 which is pivoted about a horizontal axis 27.

In the arrangement shown in FIG. 5, the castored wheel 26 is mounted on a horizontal rod 28 which extends the length of the base portion 22 and is carried in bearings 29 at each end so as to enable it to pivot about a horizontal axis. This rod 28 is connected at the front end to the castored wheel and at the rear end is provided with a handle 30 which moves with the rod 28 and extends upwards to the upper region of the rear portion 23. As can be seen, the upper portion of this handle 30 is provided with suitable hand grips 31 and is used to push or pull the transporter, steering being achieved, at the same time, tilting the handle to right or left. Stop means 32 are provided to prevent excessive tilting of the handle 30.

In the transporter shown in FIG. 6, the castored wheel 26 has its castoring axis extending upwardly by a handle 33 and the handle or the castoring frame 34 of the wheel 26 is pivoted about the horizontal axis to the front end of the base portion 22 of the transporter. The handle is provided with a hand grip 35 at its upper end and is used to push or pull the trolley, steering being achieved by tilting of the handle to one side or the other. These stop means are shown at 36.

FIG. 7 shows a shopping trolley which is steered in accordance with the principle of the invention. In this case the shopping trolley 40 comprises generally "U" shaped framework 41 in which are provided an upper portion 42 and a lower portion 43, both extending horizontally, and joined by a connecting portion 44. Both the upper and the lower portions 42 and 43 are suitably provided with means 45 for retention of shopping baskets, supermarket baskets or the like 46.

The lower portion 43 is supported on two fixed wheels 47 at one end and by a single castored wheel 48 at the other end. In the case of this trolley, in order to raise the height of the lower portion 43 of the frame a suitable distance off the ground to make it easier to load, the fixed wheels are mounted on extended leg portions 49 and the castoring axis of the castor is extending upwardly as at 50. In fact the castoring axis is extending to a point where it merges into a suitable handle 51, which extends upwards to a suitable height for operation of the trolley. The horizontal pivot required 52 for enabling steering of the trolley may be provided either at the lower portion 43 of the framework (as shown) or at the upper portion 42 of the framework. With the handgrip 53 provided at the end of the handle 51, the trolley may be pushed or pulled as desired and at the same time steered by tilting the handle to one side or the other. Stops 54 are provided for the handle.

It will be appreciated that because of the basic nature of the principle of the invention, the uses to which the invention can be put are too numerous to mention in detail. However, as examples can be mentioned for industrial application: mobile benches, hospital trolleys and stretchers, instrument and general tool trolleys, invalid carriages, motorised trolleys of various sorts, executive chairs, moveable filing cabinets and roll pallets. For home use it could be used for television stands, carpet sweepers and shampooers, moveable beds, coffee tables, tea trolleys, hostess trolleys, record and other storage units, moveable wardrobes, moveable scaffolding decorating units and runners for positioning under articles of furniture such as cookers, fridges, washing machines etc. In the garden it could be applied to lawn mowers, work trolleys, water carriers, rubbish containers and cultivators. For use in toys it could be applied to scooters, baby walkers, and other mobile toys such as horses, bears etc., dolls prams tobbogans etc. It has further miscellaneous applications in golf trolleys, moveable car jacks, car work trolleys, push chairs or baby carriages, vehicle trailers, laundry containers etc. As can be seen from this by no means exhaustive list, the principle of the invention can be applied, in general, wherever a steerable vehicle is required.

Furthermore, it is not necessary that the carriers shall comprise wheels but they may also include skids, ice skate like arrangements, paired wheel arrangements such as are provided on roller skates or skate boards. However, it is envisaged that wheels are most likely to provide the most useful aspect of the invention.

Of course additional perfeatures could be provided as desired and these could include controlling the castoring axis by means of steering wheels and the like. Furthermore, it is not necessary that the device should in fact be operated on three wheels but could be operated on two wheels for such articles as scooters and arrangements could even be provided which would operate on a four wheel vehicle having a two castored wheels where axes are connected by a linkage so that they can be tilted together.

It will be understood that the above description of the present invention is susceptible to various modification and adaptations.

What is claimed is:

1. A vehicle comprising a support surface, a plurality of carriers on which said support surface is mounted, a castor like structure including a castoring axis and a castor element freely pivotable about said castoring axis for at least one of said carriers, steering pivot means for enabling tilting of said castoring axis relative to said support surface and steering means operable for tilting said castoring axis of said castor like structure about said steering pivot means to steer the vehicle.

2. A vehicle as defined in claim 1 and comprising three said carriers.

3. A vehicle as defined in claim 2, and comprising two fixed carriers at one end and said castor like structure at the other end.

4. A vehicle as defined in claim 1, wherein said support surface comprises a platform mounted on a frame, with said carriers support directly to said frame.

5. A vehicle as defined in claim 1, wherein said carriers comprise wheels.

6. A vehicle as defined in claim 1, and comprising stop means for limiting the tilting of said castoring axis.

7. A vehicle comprising a framework, two wheels supporting a rear of said framework, a steerable castored wheel supporting a front of said framework and including a castoring axis and a castor wheel freely pivotable about said castoring axis, a seat member mounted towards the rear of said framework, a foot support crossbar mounted towards the front of said framework, steering pivot means for enabling tilting of said castoring axis relative to said seat member and steering means operable by a person seated in said seat for tilting said castoring axis of said steerable castor wheel about said steering pivot means to thereby steer the vehicle.

8. A vehicle as defined in claim 7, wherein said framework comprises a generally "T" shaped structure comprising a cross bar and a stem with said rear wheels located at the end of said crossbar and said castor wheel fixedly attached to the base of said stem, and said steering pivot means is arranged to enable at least said base part of said stem to be pivotable about its own axis to incline said castoring axis of said castor wheel.

9. A vehicle as defined in claim 8, wherein said steering means comprises a joystick extending upwardly from and mounted on said pivotable part of said stem for controlling the movement of said pivotable part of said stem to steer the vehicle.

10. A vehicle as defined in claim 8, wherein said crossbar is mounted on said pivotable part of said stem for movement therewith.

11. A vehicle as defined in claim 7, and comprising a hand-operated brake acting on said rear wheels.

12. A vehicle as defined in claim 7, and comprising stop means for limiting tilting of said castoring axis.

13. A vehicle comprising an "L" shaped framework including a base part for carrying luggage or other articles and an upright rear part, two fixed wheels supporting the rear of said base part where it is connected said upright part, a castored wheel supporting the front of said base part and including a castoring axis and a castor wheel freely pivotable about said castoring axis, steering pivot means for enabling tilting of said castoring axis relative to said base part and steering means operable for tilting said castoring axis of said castored wheel about said steering pivot means to steer the vehicle.

14. A vehicle as defined in claim 13, wherein said steering pivot means comprises a horizontally rearwardly extending rod pivotable about its own axis for carrying said castored wheel, and said steering means comprises a handle connected to said rod for pivotal movement therewith and extending upwardly to the region of the top of said upright rear part.

15. A vehicle as defined in claim 13, wherein said steering pivot means comprises a horizontal pivot at the front of the base part for carrying said castored wheel and said steering means comprises a handle extending said castoring axis of said castored wheel upwards.

16. A vehicle as defined in claim 13, and comprising stop means for limiting the tilting of said castoring axis.

17. A vehicle comprising a substantially "U" shaped frame including two horizontally extending parts spaced apart vertically and joined by a part extending between them, a pair of fixed wheels carrying one end of the lower of the said two horizontally extending parts, a castored wheel carrying the other end of said lower horizontally extending part and including a castoring axis and a castor wheel freely pivotable about said castoring axis, steering pivot means for enabling tilting of said castoring axis relative to said frame and steering means operable for tilting said castoring axis of said castored wheel about said steering pivot means to steer the vehicle.

18. A vehicle as defined in claim 17, wherein said steering pivot
means comprises a pivot with a horizontal axis on which said castored wheel is mounted and said steering means comprises a handle for extending said castoring axis.

19. A vehicle as defined in claim 17, and comprising stop means for limiting the tilting of said castoring axis.

* * * * *